United States Patent Office 3,282,780
Patented Nov. 1, 1966

1

3,282,780
LINCOMYCIN SALT
David G. Martin, Kalamazoo, Mich., assignor to The Upjohn Company, Kalamazoo, Mich., a corporation of Delaware
No Drawing. Filed Mar. 4, 1963, Ser. No. 262,310
4 Claims. (Cl. 167—65)

This invention relates to novel salts of lincomycin and, more particularly, to lincomycin mono- and bis-4-biphenylylphosphates and to compositions containing these salts.

Lincomycin is a recently discovered antibiotic demonstrating pronounced activity against certain Gram-positive organisms, including especially *Staphylococcus aureus*, *Diplococcus pneumoniae*, and the beta-hemolytic streptococci. The effectiveness of this antibiotic has been demonstrated in humans and animals against infections due to susceptible pathogens. However, the antibiotic base and the salts heretofore investigated have been characterized by disagreeable taste properties.

Both the therapeutic usefulness and pharmaceutical elegance of lincomycin compositions are enhanced by incorporation of lincomycin as the lincomycin salts of this invention identified by the formula:

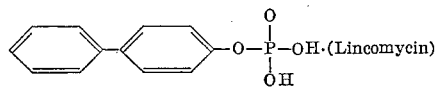

and

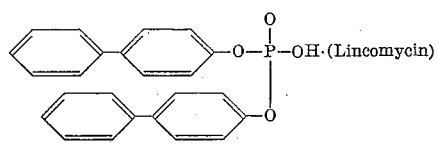

For example, it has now been unexpectedly found that the lincomycin salts of mono- and bis-4-biphenylylphosphoric acids make possible lincomycin therapy in liquid form with the bitter taste greatly diminished. In addition, product stability is improved and a delayed release of active medicament is realized from these salts.

Lincomycin mono- and bis-4-biphenylylphosphates are particularly suited to oral administration in conjunction with pharmaceutical carriers in the form of capsules, tablets, and fluid suspensions (including syrups). The unit dosage forms of these compositions contain from about 100 to about 1000 mg. of the desired biphenylylphosphate of lincomycin. In general, liquid preparations, based on single doses of 5 ml., should contain from about 2 to about 25% lincomycin arylphosphate.

Administration of the novel lincomycin salts in pharmaceutical formulations as disclosed herein can be on a schedule of from about 100 to about 1000 mg. given one to four times daily, depending on the patient's age, weight, condition and the nature of the infection being treated.

It is to be understood that this invention embraces, in addition to lincomycin mono- and bis-4-biphenylylphosphates as new chemical entities, pharmaceutical compositions including such salts with or without supplementary active ingredients. The essential feature of these compositions is therefore the presence of a lincomycin biphenylylphosphate as herein defined. It is likewise to be understood that the usual adjuvants are contemplated for the solid dosage forms, such as capsules and tablets, in order to render the lincomycin biphenylylphosphates hereof more adaptable to production procedures. Similarly, the fluid suspension and similar liquid preparations can include suspending agents, flavoring agents, preservatives and other materials designed to facilitate the preparation of a stable and pharmaceutically elegant product.

2

The preparation of the novel salts of this invention follows classic procedures in which, for example, mono- or bis-4-biphenylylphosphoric acid is added to lincomycin in organic solvents. Preparation of the lincomycin base is described in South African Patent No. 2184/62, Belgian Patent No. 619,645 and U.S. application Serial No. 121,696, filed July 3, 1961 now U.S. Patent No. 3,086,912.

The following examples set forth the best mode contemplated by the inventor for carrying out this invention, but these examples are not to be construed as limiting the scope thereof.

*Example 1.—Lincomycin bis-4-biphenylylphosphate*

Bis-4-biphenylylphosphoric acid (6.65 gm.) (Berichte 92:2051 [1959]) was suspended in 300 ml. of absolute ethanol with stirring. To the suspension was added 6.72 gm. of lincomycin. After several minutes stirring solution was effected. The solution was filtered to remove a small amount of insoluble material. The filtrate was concentrated to a small volume under reduced pressure, diluted with ethyl acetate and concentrated to dryness under reduced pressure. The solid residue (13.4 gm.) had practically no taste. This residue was dissolved in methylene chloride and filtered. The filtrate was concentrated to dryness under reduced pressure, leaving a foamy, partly solid residue. This residue was triturated with ether, collected and washed thoroughly with ether to give 13.2 gm. of lincomycin bis-4-biphenylylphosphate.

*Analysis.*—Calcd. for $C_{42}H_{53}N_2O_{10}PS$: N, 3.46; S, 3.96; P, 3.96. Found: N, 3.36; S, 4.40; P, 3.87.

*Example 2.—Lincomycin mono-4-biphenylylphosphate*

Mono-4-biphenylylphosphoric acid (Berichte supra) (4.65 gm.) was dissolved in 500 ml. ethyl acetate. To this solution was added 7.53 gm. lincomycin in 100 ml. ethyl acetate. The resulting solid was collected, washed with ethyl acetate, and dried to give 10.4 gm. of lincomycin mono-4-biphenylylphosphate.

*Analysis.*—Calcd. for $C_{30}H_{45}N_2O_{10}PS$: N, 4.27; S, 4.88. Found: N, 3.65; S, 5.05.

*Example 3.—Oral syrup*

One thousand milliliters of an aqueous suspension for oral use, containing in each 5 ml. 1000 mg. of lincomycin mono-4-biphenylylphosphate, is prepared from the following ingredients:

| Ingredient | Unit | Amount |
|---|---|---|
| Lincomycin mono-4-biphenylylphosphate | gm | 200 |
| Tragacanth | do | 3 |
| Sucrose | do | 650 |
| Methylparaben | do | 0.75 |
| Propylparaben | do | 0.25 |
| Sorbic acid | do | 1 |
| Sodium cyclamate | do | 20 |
| Saccharin sodium | do | 2 |
| Citric acid | do | 2 |
| Oil of peppermint | ml | 0.25 |
| Oil of orange | do | 0.125 |
| Cocoa | gm | 100 |
| Deionized water, q.s. | ml | 1000 |

The tragacanth, sucrose, parabens, sorbic acid and oils are dispersed in sufficient water to make 800 ml. of syrup. The powdered lincomycin mono-4-biphenylylphosphate and cocoa are stirred into the syrup until distribution is uniform. Sufficient water is added to make up the final volume.

One teaspoonful twice a day is given to adults in the treatment of infection due to *D. pneumoniae*.

Lincomycin bis-4-biphenylylphosphate can be substituted for the lincomycin salt above and the resulting composition utilized in the same manner.

What is claimed is:
1. Lincomycin mono-4-biphenylylphosphate.

2. A pharmaceutical preparation comprising: from about 100 to about 1000 mg. of a compound selected from the group consisting of lincomycin mono-4-biphenylylphosphate and lincomycin bis-4-biphenylylphosphate, dispersed in a pharmaceutical carrier.

3. A fluid pharmaceutical preparation for oral administration comprising: from about 2 to about 25% of lincomycin mono-4-biphenylylphosphate, dispersed in a liquid pharmaceutical carrier.

4. A fluid pharmaceutical preparation for oral administration comprising: from about 2 to about 25% of lincomycin bis-4-biphenylylphosphate, dispersed in a liquid pharmaceutical carrier.

References Cited by the Examiner
UNITED STATES PATENTS 3,086,912   4/1963   Bergy _____ 167—65

JULIAN S. LEVITT, *Primary Examiner.*

S. ROSEN, *Assistant Examiner.*